US012333503B2

(12) United States Patent
Price et al.

(10) Patent No.: US 12,333,503 B2
(45) Date of Patent: Jun. 17, 2025

(54) VISUALIZATION OF DAMAGE ON IMAGES

(71) Applicant: Capital One Services, LLC, McLean, VA (US)

(72) Inventors: Micah Price, Anna, TX (US); Geoffrey Dagley, McKinney, TX (US); Avid Ghamsari, Frisco, TX (US); Qiaochu Tang, The Colony, TX (US); Staevan Duckworth, The Colony, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/327,308

(22) Filed: Jun. 1, 2023

(65) Prior Publication Data
US 2023/0306381 A1    Sep. 28, 2023

Related U.S. Application Data

(63) Continuation of application No. 17/301,423, filed on Apr. 2, 2021, now Pat. No. 11,676,113, which is a
(Continued)

(51) Int. Cl.
*G06Q 10/20* (2023.01)
*G06N 3/08* (2023.01)
(Continued)

(52) U.S. Cl.
CPC ............ *G06Q 10/20* (2013.01); *G06N 3/08* (2013.01); *G06T 7/001* (2013.01); *G06T 7/12* (2017.01);
(Continued)

(58) Field of Classification Search
None
See application file for complete search history.

(56) References Cited

U.S. PATENT DOCUMENTS 8,094,182 B2    1/2012    Park et al.
8,879,813 B1 *  11/2014   Solanki ............... G06T 3/14
                                               382/128
(Continued)

OTHER PUBLICATIONS

Wang, Xinkuang, Wenjing Li, and Zhongcheng Wu. "Cardd: A new dataset for vision-based car damage detection." IEEE Transactions on Intelligent Transportation Systems 24.7 (2023): 7202-7214. (Year: 2023).*
(Continued)

*Primary Examiner* — Michelle M Entezari Hausmann
(74) *Attorney, Agent, or Firm* — Harrity & Harrity, LLP

(57) ABSTRACT

A device may receive images of an object and information identifying the object, process the images using an artificial intelligence technique to identify parts of the object that are depicted in the images, and receive information identifying a location of damage on the object and information regarding the damage on the object. The device may process the information identifying the location of damage to identify a damaged part of the object, identify images depicting the damaged part, and identify, in the images, a location of the damaged part. The device may generate a first content item for display at the location of the damaged part in the images and generate a second content item for display with the images based on user interaction with the first content item, where the second content item includes information based on the information regarding the damage on the object.

20 Claims, 8 Drawing Sheets

Related U.S. Application Data continuation of application No. 16/741,320, filed on Jan. 13, 2020, now Pat. No. 10,970,835.

(51) Int. Cl.

| | |
|---|---|
| *G06T 7/00* | (2017.01) |
| *G06T 7/12* | (2017.01) |
| *G06T 7/73* | (2017.01) |
| *G06V 10/22* | (2022.01) |
| *G06V 10/25* | (2022.01) |
| *G06V 10/764* | (2022.01) |
| *G06V 20/20* | (2022.01) |

(52) U.S. Cl.
CPC .............. *G06T 7/74* (2017.01); *G06V 10/235* (2022.01); *G06V 10/25* (2022.01); *G06V 10/764* (2022.01); *G06V 20/20* (2022.01); *G06T 2200/24* (2013.01)

(56) References Cited

U.S. PATENT DOCUMENTS

| | | | |
|---|---|---|---|
| 9,218,626 | B1 | 12/2015 | Haller, Jr. et al. |
| 9,412,203 | B1 | 8/2016 | Garcia, III et al. |
| 10,031,906 | B2 | 7/2018 | Campbell et al. |
| 10,332,209 | B1 | 6/2019 | Brandmaier et al. |
| 10,360,601 | B1 | 7/2019 | Adegan |
| 10,475,160 | B1 | 11/2019 | Conroy et al. |
| 10,610,098 | B1* | 4/2020 | Soliz ................ G06V 40/197 |
| 10,699,168 | B1 | 6/2020 | Xu |
| 10,891,694 | B1 | 1/2021 | Leise et al. |
| 10,970,835 | B1 | 4/2021 | Price et al. |
| 11,080,838 | B1* | 8/2021 | Li .................... G06T 7/0002 |
| 11,430,069 | B1* | 8/2022 | Pedersen ................ H04N 7/185 |
| 11,556,995 | B1* | 1/2023 | Little .................... G06Q 40/08 |
| 2002/0115423 | A1 | 8/2002 | Hatae et al. |
| 2004/0148188 | A1* | 7/2004 | Uegaki ................ G06Q 10/06 705/305 |
| 2005/0251427 | A1 | 11/2005 | Dorai et al. |
| 2009/0055043 | A1 | 2/2009 | Mian et al. |
| 2010/0241946 | A1* | 9/2010 | Ofek ................ G06F 16/583 715/231 |
| 2011/0180107 | A1* | 7/2011 | Dahl ........................ B07B 1/55 134/18 |
| 2016/0093078 | A1* | 3/2016 | Davis ................... G11B 27/034 345/629 |
| 2017/0061459 | A1 | 3/2017 | Dow et al. |
| 2017/0061506 | A1 | 3/2017 | Dow et al. |
| 2017/0098014 | A1* | 4/2017 | Rawlings ................ G06F 16/51 |
| 2017/0147991 | A1 | 5/2017 | Franke et al. |
| 2018/0121888 | A1* | 5/2018 | O'Reilly ................ G06F 16/27 |
| 2018/0260793 | A1 | 9/2018 | Li et al. |
| 2018/0350163 | A1 | 12/2018 | Pofale et al. |
| 2019/0026558 | A1* | 1/2019 | Tanigawa ................ G06T 19/20 |
| 2019/0095877 | A1* | 3/2019 | Li ............................ G06V 20/63 |
| 2019/0185186 | A1* | 6/2019 | Li ............................ G06T 17/00 |
| 2019/0286153 | A1* | 9/2019 | Rankawat ............ G05D 1/0246 |
| 2020/0035195 | A1* | 1/2020 | Maeng ................... G06F 3/1423 |
| 2020/0074222 | A1 | 3/2020 | Guo et al. |
| 2020/0111061 | A1 | 4/2020 | Stucki et al. |
| 2020/0118365 | A1 | 4/2020 | Wang et al. |
| 2020/0143519 | A1* | 5/2020 | Gordon ................ G06T 3/4046 |
| 2020/0231109 | A1* | 7/2020 | Baltaxe ................ G06N 3/08 |
| 2020/0351543 | A1 | 11/2020 | Kerofsky et al. |
| 2020/0394813 | A1* | 12/2020 | Theverapperuma ........................ G06F 18/2431 |
| 2021/0118141 | A1* | 4/2021 | Huang ................ G09G 3/3607 |
| 2021/0192264 | A1 | 6/2021 | Li et al. |
| 2021/0224968 | A1 | 7/2021 | Price et al. |
| 2021/0310955 | A1* | 10/2021 | Dahan .............. G01N 21/95607 |
| 2022/0036463 | A1* | 2/2022 | Faga ..................... G06Q 10/10 |
| 2022/0148050 | A1 | 5/2022 | Gandhi et al. |
| 2023/0012796 | A1 | 1/2023 | Liu et al. |
| 2023/0143738 | A1* | 5/2023 | Kim ........................ G06T 11/60 382/141 |

OTHER PUBLICATIONS

Spencer Jr, Billie F., Vedhus Hoskere, and Yasutaka Narazaki. "Advances in computer vision-based civil infrastructure inspection and monitoring." Engineering 5.2 (2019): 199-222. (Year: 2019).*

Chen Q, Gan X, Huang W, Feng J, Shim H. Road damage detection and classification using mask R-CNN with DenseNet backbone. Comput. Mater. Contin. Jan. 1, 2020;65(3):2201-15. (Year: 2020).*

* cited by examiner

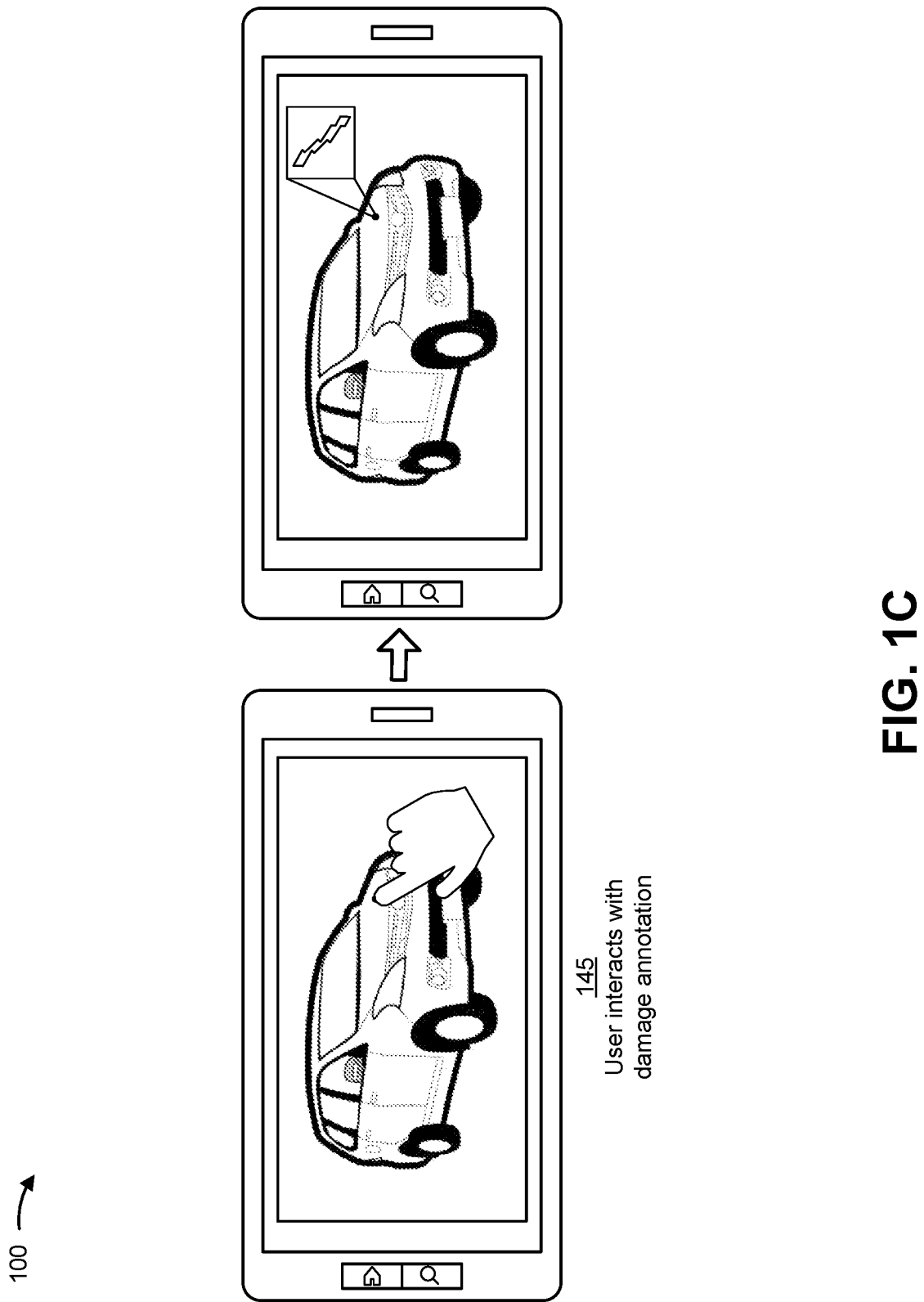

VISUALIZATION OF DAMAGE ON IMAGES

RELATED APPLICATION

This application is a continuation of U.S. patent application Ser. No. 17/301,423, filed Apr. 2, 2021 (now U.S. Pat. No. 11,676,113), which is a continuation of U.S. patent application Ser. No. 16/741,320, filed Jan. 13, 2020 (now U.S. Pat. No. 10,970,835), which are incorporated herein by reference in their entirety.

BACKGROUND

A vehicle dealership may obtain one or more images of a vehicle and provide the one or more images and information regarding the vehicle to a website for potential customers to view online.

SUMMARY

According to some implementations, a method may include receiving, by a first device, a plurality of images of an object and information identifying the object; processing, by the first device, the plurality of images using an artificial intelligence technique to identify one or more parts of the object that are depicted in the plurality of images; receiving, by the first device, information identifying a location of damage on the object and information regarding the damage on the object; processing, by the first device, the information identifying the location of damage on the object to identify a damaged part of the object; identifying, by the first device and from the plurality of images, one or more images depicting the damaged part; identifying, by the first device and in the one or more images, a location of the damaged part; generating, by the first device, a first content item for display at the location of the damaged part in the one or more images; generating, by the first device, a second content item for display with the one or more images, wherein the second content item includes information based on the information regarding the damage on the object; transmitting, by the first device and to a second device, the one or more images of the object and the first content item for display at the location of the damaged part in the one or more images; and transmitting, by the first device and to the second device, the second content item for display with the one or more images based on user interaction with the first content item.

According to some implementations, a device may include one or more memories; and one or more processors, communicatively coupled to the one or more memories, configured to: receive a plurality of images of a vehicle and information identifying the vehicle; process the plurality of images using an artificial intelligence technique to identify one or more parts of the vehicle that are depicted in the plurality of images, wherein the artificial intelligence technique includes at least one of a machine learning model or an image segmentation technique; receive information identifying a location of damage on the vehicle and information regarding the damage on the vehicle; process the information identifying the location of damage on the vehicle to identify a damaged part of the vehicle; identify, from the plurality of images, one or more images depicting the damaged part; identify, in the one or more images, a location of the damaged part; generate a first content item for display at the location of the damaged part in the one or more images; generate a second content item for display with the one or more images, wherein the second content item includes information based on the information regarding the damage on the vehicle; transmit, to another device, the one or more images of the vehicle and the first content item for display at the location of the damaged part in the one or more images; and transmit, to the other device, the second content item for display with the one or more images based on user interaction with the first content item.

According to some implementations, a non-transitory computer-readable medium may store one or more instructions. The one or more instructions, when executed by one or more processors of a first device, may cause the one or more processors to: receive a plurality of images of an object; process the plurality of images using one or more artificial intelligence techniques to identify one or more parts of the object that are depicted in the plurality of images; determine a location of damage on the object and information regarding the damage on the object; process the location of damage on the object to identify a damaged part of the object; identify, from the plurality of images, one or more images depicting the damaged part; identify, in the one or more images, a location of the damaged part; generate a first content item for display at the location of the damaged part in the one or more images, wherein the first content item occupies less than a total number of pixels depicting the damaged part; generate a second content item for display with the one or more images, wherein the second content item includes a close-up image of damage on the damaged part; transmit the one or more images of the object and the first content item for display at the location of the damaged part in the one or more images; and transmit the second content item for display with the one or more images based on user interaction with the first content item.

BRIEF DESCRIPTION OF THE DRAWINGS

FIGS. 1A-1C are diagrams of one or more example implementations described herein.

DETAILED DESCRIPTION

Figure 1A:
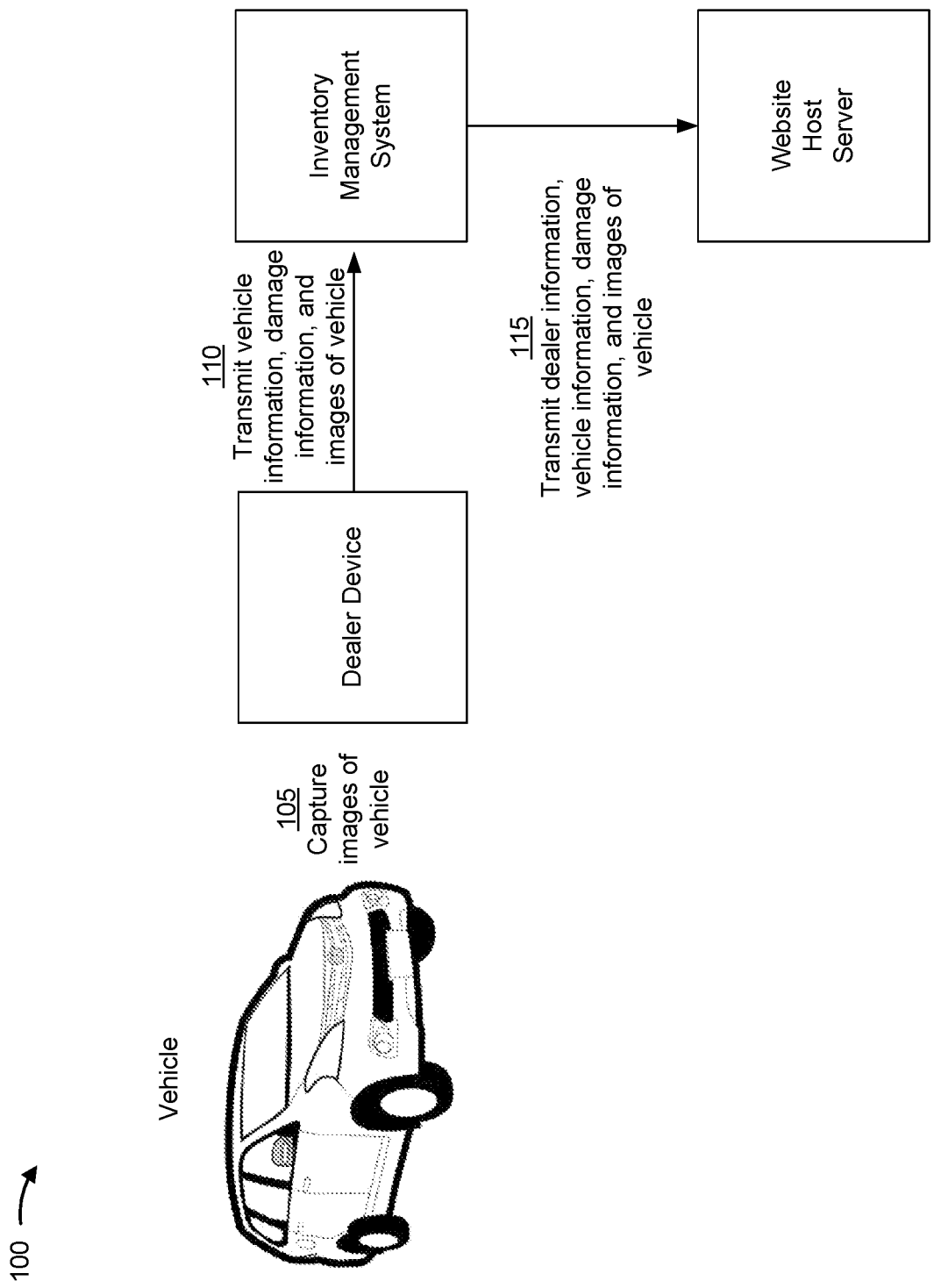

The following detailed description of example implementations refers to the accompanying drawings. The same reference numbers in different drawings may identify the same or similar elements.

A vehicle dealer (e.g., a car dealership, an individual selling a vehicle, a boat dealership, and/or the like) may provide images of a vehicle and information regarding the vehicle (e.g., a make, a model, and a year of the vehicle, a vehicle identification number (VIN), a description of the condition of the vehicle (e.g., a description of damaged parts of the vehicle, a description of the condition of the interior, and/or the like), and/or the like to a website for potential customers to view online. Additionally, or alternatively, the vehicle dealer may provide the images and information to an inventory management system, which provides the images to the website. The website host server may process the images (e.g., to embed data in the images, to provide enhanced user interfaces using the images, and/or the like). To provide images suitable for processing by the website (e.g., images having uniform characteristics (e.g., resolutions, aspect ratios, color conditions, lighting conditions, brightness conditions, orientations with respect to the vehicle, and/or the like), images captured using the same camera, and/or the like), the vehicle dealer may purchase specialized equipment (e.g., a particular camera system, a standard backdrop, a mount to achieve precise orientation of the camera with the vehicle, and/or the like), which consumes significant financial resources. If the vehicle dealer does not use specialized equipment, processing the images with non-uniform characteristics consumes computing resources (e.g., processing resources, memory resources, power resources, communication resources, and/or the like) and/or network resources, and, in some cases, the website host server may not be able to process the images adequately due to the non-uniform characteristics. Furthermore, when multiple vehicle dealers provide images to the website host server, the non-uniformity of the image characteristics increases, resulting in even greater consumption of computing resources (e.g., processing resources, memory resources, power resources, communication resources, and/or the like) and/or network resources to process the images.

Some implementations described herein may provide an image annotation platform that receives a plurality of images that may be captured with a variety of types of cameras, in a variety of lighting conditions, from a variety of orientations (e.g., without use of a particular camera system, a standard backdrop, a mount to achieve precise orientation of the camera with the vehicle, and/or the like) and/or may have a plurality of image characteristics, processes the images to identify parts of the vehicle in the images, processes information (e.g., provided by a vehicle dealer) identifying a location of damage on the vehicle, and generates content items for display at a location of a damaged part in one or more of the images. In some implementations, the image annotation platform may process the plurality of images to generate standardized images having common image characteristics and use one or more artificial intelligence techniques on the standardized images to identify parts of the vehicle in the images. In some implementations, the image annotation platform may assign the plurality of images to one or more classes of images based on the characteristics of the plurality of images and use one or more artificial intelligence techniques specific to the one or more classes to identify parts of the vehicle in the images. In this way, the image annotation platform may receive and process images having a plurality of image characteristics and provide, based on information provided by vehicle dealers, visualizations of damage on the images of the vehicles, while eliminating the need for vehicle dealers to purchase specialized equipment to sell vehicles on the website. Additionally, or alternatively, the image annotation platform may receive and process images having a plurality of image characteristics, while conserving computing resources (e.g., processing resources, memory resources, power resources, communication resources, and/or the like) and/or network resources.

Figure 1B:
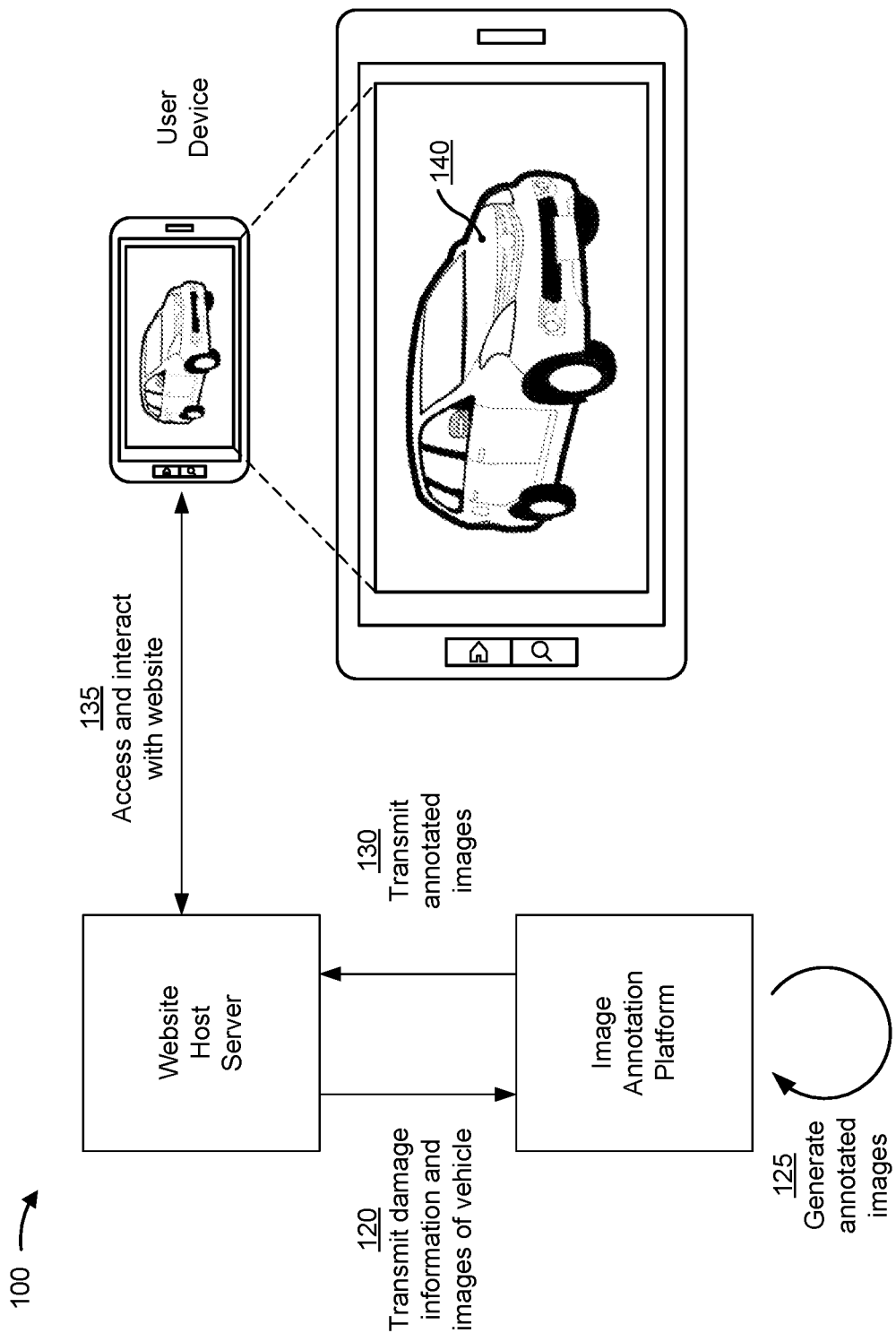

FIGS. 1A-1C are diagrams of one or more example implementations 100 described herein. As shown in FIGS. 1A-1C, example implementation(s) 100 includes a dealer device, an inventory management system, a website host server, an image annotation platform, and a user device. In the following description, example implementation(s) 100 is described in a context that relates to visualizing damage in images of vehicles. However, it will be appreciated that this description is for illustration purposes only, and that the techniques described herein may be used to visualize information related to a condition of any suitable object (e.g., a house or other real estate, furniture, jewelry, electronic equipment, musical instrument, and/or the like).

As shown in FIG. 1A, and by reference number 105, a dealer device (e.g., a smartphone, a tablet, a digital camera, and/or the like) may capture images of a vehicle. The dealer device may be associated with a vehicle dealer (e.g., a car dealership, an individual selling a vehicle, a boat dealership, and/or the like). In some implementations, the dealer device may receive images of the vehicle from another device (e.g., from a camera and/or computer of a professional photographer, from a device owned by an employee of the vehicle dealer, and/or the like). In some implementations, the dealer device (or the other device) may capture some of the images of the vehicle at different times (e.g., on different days, after buying or receiving the vehicle and then again when uploading information regarding the vehicle to an inventory management system, and/or the like), different locations (e.g., one set of images captured outside and another set of images captured in a showroom, and/or the like), and/or the like. As a result of the varying devices, times, and/or locations, the images of the vehicle may include images originating from a plurality of sources, having a plurality of orientations with respect to the vehicle, and/or having a plurality of image characteristics (e.g., a plurality of resolutions, a plurality of aspect ratios, a plurality of color conditions, a plurality of lighting conditions (e.g., due to being captured at different locations and/or times), and/or the like).

Additionally, or alternatively, the dealer device may capture any number of images of the vehicle and may capture different numbers of images for different vehicles. For example, the dealer device may capture ten images of a first vehicle and twenty images of a second vehicle.

In some implementations, the dealer device may capture images of the vehicle, where the images include one or more images of one or more damaged parts of the vehicle. For example, the images may include a close-up image of a scratch, crack, dent, discoloration, rust, and/or the like on a part of the vehicle (e.g., a door, a hood, a roof, and/or the like), a location of a missing part of the vehicle (e.g., a missing button, a missing gas cap, and/or the like), and/or the like.

In some implementations, the dealer device may receive (e.g., from the vehicle dealer performing a visual and/or mechanical inspection of the vehicle, from a database containing historical information regarding the vehicle, and/or the like) damage information regarding the vehicle. The damage information may include a description of one or more damaged parts of the vehicle, of one or more missing parts of the vehicle, of conditions of one or more parts of the vehicle, and/or the like. For example, the damage information may include a description that the vehicle has a scratch on the hood.

In some implementations, the dealer device may receive vehicle information that identifies the vehicle (e.g., a make, a model, and a year of the vehicle, a VIN, and/or the like). The dealer device may receive, from the vehicle dealer, input (e.g., via a touchscreen, a keyboard, an image of the VIN, an image of a license plate, and/or the like) that includes the vehicle information. For example, the vehicle dealer may provide to the dealer device and/or use the dealer device to capture an image of the VIN, an image of the license plate, an image of the make or model of the vehicle, and/or the like, and use image processing techniques (e.g., optical character recognition (OCR), computer vision, and/or the like) to identify the vehicle.

As shown in FIG. 1A, and by reference number 110, the dealer device may transmit, to the inventory management system, the vehicle information, the damage information, and the images of the vehicle. In some implementations, the dealer device may transmit, to the inventory management system, the vehicle information and the images of the vehicle without obtaining or transmitting damage information. The inventory management system may store the vehicle information, the damage information, and/or the images of the vehicle in a data structure that includes vehicle data associated with vehicles owned by the vehicle dealer.

As shown in FIG. 1A, and by reference number 115, the inventory management system may transmit dealer information (e.g., information identifying the vehicle dealer, and/or the like), the vehicle information, the damage information, and/or the images of the vehicle to the website host server. In some implementations, the inventory management system may transmit, at regular time intervals (e.g., hourly, daily, weekly, monthly, and/or the like), the dealer information, the vehicle information, the damage information, and/or the images of the vehicle and/or other vehicles for which the inventory management system has received new information and/or new images. For example, the inventory management system may transmit the information and/or images to the website host server to keep information and/or images on a website updated to reflect current inventory of the vehicle dealer.

Additionally, or alternatively, the inventory management system may automatically transmit, to the website host server, the dealer information, the vehicle information, the damage information, and/or the images of the vehicle before, while, and/or after storing the vehicle information, the damage information, and/or the images of the vehicle in the data structure. For example, the inventory management system may receive, from the dealer device, the vehicle information, the damage information, and/or the images of the vehicle, and concurrently store the vehicle information, the damage information, and/or the images of the vehicle and transmit the dealer information, the vehicle information, the damage information, and/or the images of the vehicle to the website host server.

In some implementations, the dealer device may transmit the dealer information, the vehicle information, the damage information, and/or the images of the vehicle to the website host server. For example, rather than transmitting the vehicle information, the damage information, and/or the images of the vehicle to the inventory management system, which then transmits the information and/or images to the website host server, the dealer device may directly transmit the dealer information, the vehicle information, the damage information, and/or the images of the vehicle to the website host server. Additionally, or alternatively, the dealer device may directly transmit the dealer information, the vehicle information, the damage information, and/or the images of the vehicle to the website host server and transmit the vehicle information, the damage information, and/or the images of the vehicle to the inventory management system.

As shown in FIG. 1B, and by reference number 120, the website host server may transmit the damage information and/or the images of the vehicle to the image annotation platform. In some implementations, the website host server transmits the vehicle information, the damage information, and/or the images of the vehicle to the image annotation platform automatically after receiving the vehicle information, the damage information, and/or the images of the vehicle from the inventory management system and/or the dealer device.

As shown in FIG. 1B, and by reference number 125, the image annotation platform may receive and process the images of the vehicle and/or the damage information to generate annotated images. In some implementations, the image annotation platform may process the images of the vehicle to identify parts of the vehicle that are depicted in the images of the vehicle. For example, the image annotation platform may be configured to use one or more artificial intelligence techniques, such as machine learning, deep learning, and/or the like, to identify the one or more parts of the vehicle that are depicted in the image data of the vehicle images. In some implementations, the one or more artificial intelligence techniques may include a computer vision technique, such as a convolutional neural network technique, to assist in classifying the image data (e.g., data relating to distinctive feature points in the image data) into a particular class (e.g., a class indicating that the feature points share a planar surface and therefore belong to a common part). In some cases, the computer vision technique may identify the one or more parts depicted in the image data using an image recognition technique (e.g., an Inception framework, a ResNet framework, a Visual Geometry Group (VGG) framework, and/or the like), an object detection technique (e.g. a Single Shot Detector (SSD) framework, a You Only Look Once (YOLO) framework, and/or the like), an image segmentation technique, and/or the like.

Accordingly, using the one or more artificial intelligence techniques, the image annotation platform may identify one or more parts of the vehicle based on the image data corresponding to the vehicle in the images of the vehicle. For example, as shown in FIG. 1B, the parts of the vehicle depicted in the image data may include a front bumper, front headlights, a hood, a windshield, a fender, passenger-side tires, passenger-side doors, a passenger-side mirror, a gas cap, a quarter panel, and/or the like. Furthermore, using the one or more artificial intelligence techniques, the image annotation platform may identify any suitable interior and/or exterior part of the vehicle.

For example, in one or more vehicle images, the hood of the vehicle may be opened to reveal an engine bay, and the image annotation platform may analyze image data corresponding to the engine bay to identify an intake manifold, a battery, an alternator, various fluid compartments, and/or the like. In another example, one or more vehicle images may be obtained from within the vehicle, and the image annotation platform may analyze image data from the one or more vehicle images to identify an instrument panel, an infotainment system, floor pedals, a steering wheel, a glove compartment, and/or the like.

In some implementations, the image annotation platform may obtain one or more virtual models of the vehicle (e.g., schematics based on a make, model, and/or year of the vehicle), which may be used to identify the one or more parts of the vehicle using the one or more artificial intelligence techniques. For example, the image annotation platform may use any number of artificial intelligence techniques, machine learning techniques, deep learning techniques, and/or the like to generate one or more virtual models that represent the one or more parts of the vehicle. The image annotation platform may train the one or more virtual models using information that includes various parameters related to a visual appearance of parts associated with a specific vehicle (e.g., based on make, model, and year), a visual appearance of parts associated with certain vehicle types (e.g., sedans, convertibles, pickup trucks, sport utility vehicles, and/or the like), a visual appearance that certain parts typically have after a given level of wear-and-tear, a visual appearance of a vehicle as a whole, and/or the like, to output a representation of the one or more parts of the vehicle. In some implementations, the one or more virtual models may be arranged according to a hierarchy (e.g., a generic model could be used to classify vehicle image data into a particular make, make and model, and/or the like, and additional models may be used to represent various subsystems, individual parts, and/or the like based on the particular make, make and model, and/or the like).

In some implementations, as described with respect to FIG. 1A, the dealer device may provide images of the vehicle having a plurality of image characteristics (e.g., a plurality of resolutions, a plurality of aspect ratios, a plurality of color conditions, a plurality of brightness conditions, a plurality of lighting conditions (e.g., due to being captured at different locations and/or times), and/or the like). In such circumstances, the image annotation platform may process the images of the vehicle to have a common resolution, a common aspect ratio, a common color condition, a common brightness condition, a common lighting condition, and/or the like resulting in a set of standardized images of the vehicle. The image annotation platform may use the one or more artificial intelligence techniques on the standardized images of the vehicle to identify the one or more parts of the vehicle. Using the one or more artificial intelligence techniques on the standardized images, rather than the images having a plurality of image characteristics, conserves computing resources (e.g., processing resources, memory resources, power resources, communication resources, and/or the like) and/or network resources used to identify the one or more parts of the vehicle.

Additionally, or alternatively, if the dealer device provides images of the vehicle having a plurality of image characteristics, the image annotation platform may classify the images (e.g., each image, a subset of the images, all of the images, and/or the like) of the vehicle based on characteristics of the images. For each classification, the image annotation platform may use one or more artificial intelligence techniques specific to images having characteristics of the classification to identify the one or more parts of the vehicle. Using the one or more artificial intelligence techniques specific to each classification of images conserves computing resources (e.g., processing resources, memory resources, power resources, communication resources, and/or the like) and/or network resources used to identify the one or more parts of the vehicle.

In some implementations, the image annotation platform may process the damage information to identify a location of damage on the vehicle and information regarding the damage on the vehicle. For example, the image annotation platform may parse natural language descriptions in the damage information to identify the location of damage on the vehicle (e.g., the name of one or more parts that are damaged, a location of damage on one or more parts, and/or the like) and information regarding the damage (e.g., the damage is a scratch, crack, dent, discoloration, rust, and/or the like). In this way, the image annotation platform may process the damage information to identify one or more damaged parts of the vehicle.

Additionally, or alternatively, the image annotation platform may use one or more artificial intelligence techniques, such as machine learning, deep learning, and/or the like, to identify damage on the vehicle from the images of the vehicle. For example, one or more data models (e.g., machine learning models) may provide a representation of an expected visual appearance of one or more parts of the vehicle (e.g., when the one or more parts are new, after a certain level of wear-and-tear, and/or the like) and the one or more artificial intelligence techniques may be used to identify, based on the one or more images, one or more discrepancies between an actual visual appearance and the expected visual appearance of the one or more parts. Additionally, or alternatively, the one or more artificial intelligence techniques may be used to identify, based on the one or more images, one or more discrepancies between the actual visual appearance of different parts, which may indicate relative conditions of the different parts (e.g., where a majority of the exterior body parts are a first shade of a color and one particular exterior part, such as a hood, appears to be a second shade of the color, this may indicate that the one particular exterior part is newer than the various other exterior body parts, has been repainted, and/or the like). In this way, the image annotation platform may use one or more artificial intelligence techniques to identify damage on the vehicle from the images of the vehicle and/or a damaged part of the vehicle.

In some implementations, the image annotation platform, after identifying the parts of the vehicle in the images of the vehicle and identifying a damaged part of the vehicle, may identify one or more images depicting the damaged part. In other words, the image annotation platform may identify which images of the vehicle provided by the web hosting server depict the damaged part (e.g., as identified by the damage information). Furthermore, the image annotation platform may identify a location of the damaged part in the images depicting the damaged part using, for example, the one or more artificial intelligence techniques described above.

In some implementations, the image annotation platform may store information (e.g., in a data structure) identifying the damaged part of the vehicle and the damage information in association with the information identifying the vehicle (e.g., the VIN). In such circumstances, if the image annotation platform receives another set of images of the vehicle (e.g., from another dealer device), the image annotation platform may identify the location of the damaged part based on the stored information. For example, the image annotation platform may identify the parts of the vehicle in the other set of images using the one or more artificial intelligence techniques described above and, rather than processing damage information again, the image annotation platform may access the stored information identifying the damaged part and locate the damaged part in the other set of images of the vehicle. In this way, the image annotation platform may conserve computing resources (e.g., processing resources, memory resources, power resources, communication resources, and/or the like) and/or network resources that would be consumed by processing damage information again.

In some implementations, the image annotation platform may generate a first content item for display at the location of the damaged part in the one or more images depicting the damaged part. For example, the first content item may include a damage annotation, a patterned overlay, a colored overlay, a hologram, a digital or virtual object, a visual marker, a superimposed graphic, and/or the like. The first content item may include a geometric shape (e.g., a circle, a square, a triangle, and/or the like) for display at the location of the damaged part.

In some implementations, the image annotation platform may generate different types of content items for different types of damage (e.g., a scratch, crack, dent, discoloration, rust, and/or the like). For example, the image annotation platform may generate a circle when the damage is a scratch and a square when the damage is a dent. Additionally, or alternatively, the content items may vary by color, size, pattern, and/or the like based on the type of damage. In this way, the image annotation may generate similar content items for similar types of damage and/or different content items for different types of damage.

In some implementations, the first content item may occupy less than a total number of pixels depicting the damaged part. For example, the first content item may be smaller than the depicted damaged part (e.g., a circle occupying a portion of a depicted surface area of a damaged hood, a triangle occupying less than a quarter of pixels depicting a damaged door, and/or the like). In this way, the first content item may not obstruct the overall view of the vehicle but may still provide an indication that the part is damaged.

In some implementations, the image annotation platform may generate a second content item for display with the one or more images depicting the damaged part. The image annotation platform may generate the second content item based on the damage information by, for example, generating a text overlay, a text box, and/or the like that includes a description of the damage. By way of example, the second content item may include a text box including the text "Small dent on lower panel of driver-side door."

In some implementations, the image annotation platform may generate the second content item based on images of the damaged part provided by the dealer device. For example, if the dealer device provides a close-up image of a scratch, crack, dent, discoloration, rust, and/or the like, the second content item may include the close-up image. Additionally, or alternatively, the image annotation platform may generate a close-up image of the damaged part based on one or more of the images provided by the dealer by enlarging, zooming in on, and/or the like a portion of an image depicting the damaged part, and the second content item may include the close-up image.

In some implementations, the image annotation platform may generate the second content item for display at a location within the one or more images depicting the damaged part. For example, the image annotation platform may generate the second content item for display at a location that does not occupy pixels occupied by the damaged part and/or the vehicle within the one or more images depicting the damaged part (e.g., the second content item does not overlap, cover, obstruct, and/or the like the vehicle). In another example, the image annotation platform may generate the second content item for display at a location that occupies less than a total number of pixels depicting the damaged part and/or the vehicle (e.g., less than half, a quarter, a tenth, and/or the like of the total number of pixels depicting the damaged part and/or the vehicle).

In some implementations, the image annotation platform may use the parts of the vehicle as anchor points to place content items (e.g., the first content item, the second content item, and/or the like) in the images of the vehicle. The image annotation platform may establish a coordinate space corresponding to a field of view of a device that captured the images, and the content items may be generated within the coordinate space according to a pose of the device. For example, the pose of the device may be expressed according to six degrees of freedom, which include a three-dimensional position of the device combined with pitch, roll, and yaw representing an orientation through rotation about three perpendicular axes. Accordingly, the one or more anchor points may represent a relative position and orientation of one or more corresponding points in the field of view of the device for an image of the vehicle, and a pose of the one or more anchor points within the coordinate space may be automatically updated based on changes to the pose of the device in each of the images of the vehicle. When generating the content items, the content items may be placed within the coordinate space using the one or more anchor points that correspond to the one or more parts of the vehicle. When the pose of the device changes from image to image, the relative position and orientation of the one or more anchor points may remain fixed to the one or more parts.

In this way, the image annotation platform may generate annotated images including content items (e.g., a first content item, a second content item, and/or the like) for display with one or more images depicting the damaged part of the vehicle. For example, the image annotation platform may generate annotated images including a damage annotation as a first content item for display at the location of the damaged part in the one or more images depicting the damaged part and a second content item including information based on the damage information for display in the one or more images depicting the damaged part.

As shown in FIG. 1B, and by reference number 130, the image annotation platform may transmit the annotated images to the website host server. In some implementations, the image annotation platform may transmit the annotated images to the website host server and instructions indicating that the second content item is to be displayed based on user interaction with the first content item.

In some implementations, the website host server may be a server that hosts a website providing an online tool for users to search for vehicles offered for sale by a plurality of vehicle dealers, view information regarding the vehicles, apply for a loan to purchase a vehicle, and/or the like. As shown in FIG. 1B, and by reference number 135, the user device may access and interact with the website hosted by the website host server. In some implementations, the website host server may include an option on the website to permit a user to refine results of a vehicle search by various characteristics of the vehicle (e.g., make, model, year, mileage, price, color, location of vehicle dealer, and/or the like).

In some implementations, and as shown in FIG. 1B, the user device may access and interact with the website host server to display images of the vehicle. For example, the website host server may transmit, to the user device, the annotated images of the vehicle. As shown by reference number 140, the user device may display the annotated images of the vehicle including the first content item at the location of the damaged part. For example, the first content item may include a damage annotation shown as a circle on a portion of the hood of the vehicle to indicate that the hood is damaged.

As shown in FIG. 1C, and by reference number 145, the user device may receive user interaction with the damage annotation (e.g., a touch on a touchscreen, a mouse hovering on or near the damage annotation, a mouse click on or near the damage annotation, and/or the like). Based on the user interaction, the user device may display the second content item. As shown in FIG. 1C, the second content item may include a close-up image of a scratch on the hood of the vehicle displayed adjacent to the location of the damage part (e.g., at a location in the image that does not occupy pixels occupied by the damaged part and/or the vehicle, and/or the like).

In some implementations, the website host server may include a filtering option permitting a user to view only images of damage parts of the vehicle. For example, the website host server may receive user interaction selecting the filtering option and transmit the user interaction to the image annotation platform. The image annotation platform may receive the user selection and transmit, to the website host server, the one or more images depicting the damaged part without transmitting other images of the vehicle that do not depict the damaged part for display by the user device. Additionally, or alternatively, the image annotation platform, when transmitting the annotated images to the website host server, as shown by reference number 130, may include a damage note in the one or more images depicting the damaged part (e.g., in the metadata of the one or more images), and the website host server, based on the user interaction selecting the filtering option, may transmit, to the user device for display, the images including the damage note without transmitting other images of the vehicle.

In some implementations, the website host server may include a sorting option permitting a user to view search results listing vehicles in order based on the number of damage locations and/or defects on each vehicle. For example, the image annotation platform may process the information identifying locations of damage on a vehicle to determine a number of damage locations and/or defects on the vehicle, and repeat the processing for a plurality of vehicles to identify the number of damage locations and/or defects on each vehicle. The website host server may receive user interaction selecting the sorting option and transmit the user selection to the image annotation platform. The image annotation platform may receive the user selection and transmit, to the website host server, search results listing the plurality of vehicles in order based on the number of damage locations and/or defects on each vehicle. Additionally, or alternatively, the image annotation platform, when transmitting the annotated images to the website host server, as shown by reference number 130, may include a number of defects annotation for the vehicle, and the website host server, based on the user interaction selecting the sorting option, may transmit, to the user device for display, search results listing the plurality of vehicles in order based on the number of defects on each vehicle.

In this way, the image annotation platform may receive and process images having a plurality of image characteristics, provide, based on information provided by vehicle dealers, visualizations of damage on the images of the vehicles for the website hosted by the website host server and for display by the user device, while conserving computing resources (e.g., processing resources, memory resources, power resources, communication resources, and/or the like) and/or network resources. Additionally, or alternatively, the image annotation platform eliminates the need for vehicle dealers to purchase specialized equipment (e.g., a particular camera system, a standard backdrop, a mount to achieve precise orientation of the camera with the vehicle, and/or the like) to sell vehicles on the website.

As indicated above, FIGS. 1A-1C are provided as one or more examples. Other examples may differ from what is described with regard to FIGS. 1A-1C. For example, there may be additional devices and/or networks, fewer devices and/or networks, different devices and/or networks, or differently arranged devices and/or networks than those shown in FIGS. 1A-1C. Furthermore, two or more devices shown in FIGS. 1A-1C may be implemented within a single device, or a single device shown in FIGS. 1A-1C may be implemented as multiple and/or distributed devices. Additionally, or alternatively, a set of devices (e.g., one or more devices) of example implementation(s) 100 may perform one or more functions described as being performed by another set of devices of example implementation(s) 100. For example, every operation described herein as being performed by the image annotation platform may be performed by the website host server, and vice versa.

Figure 2:
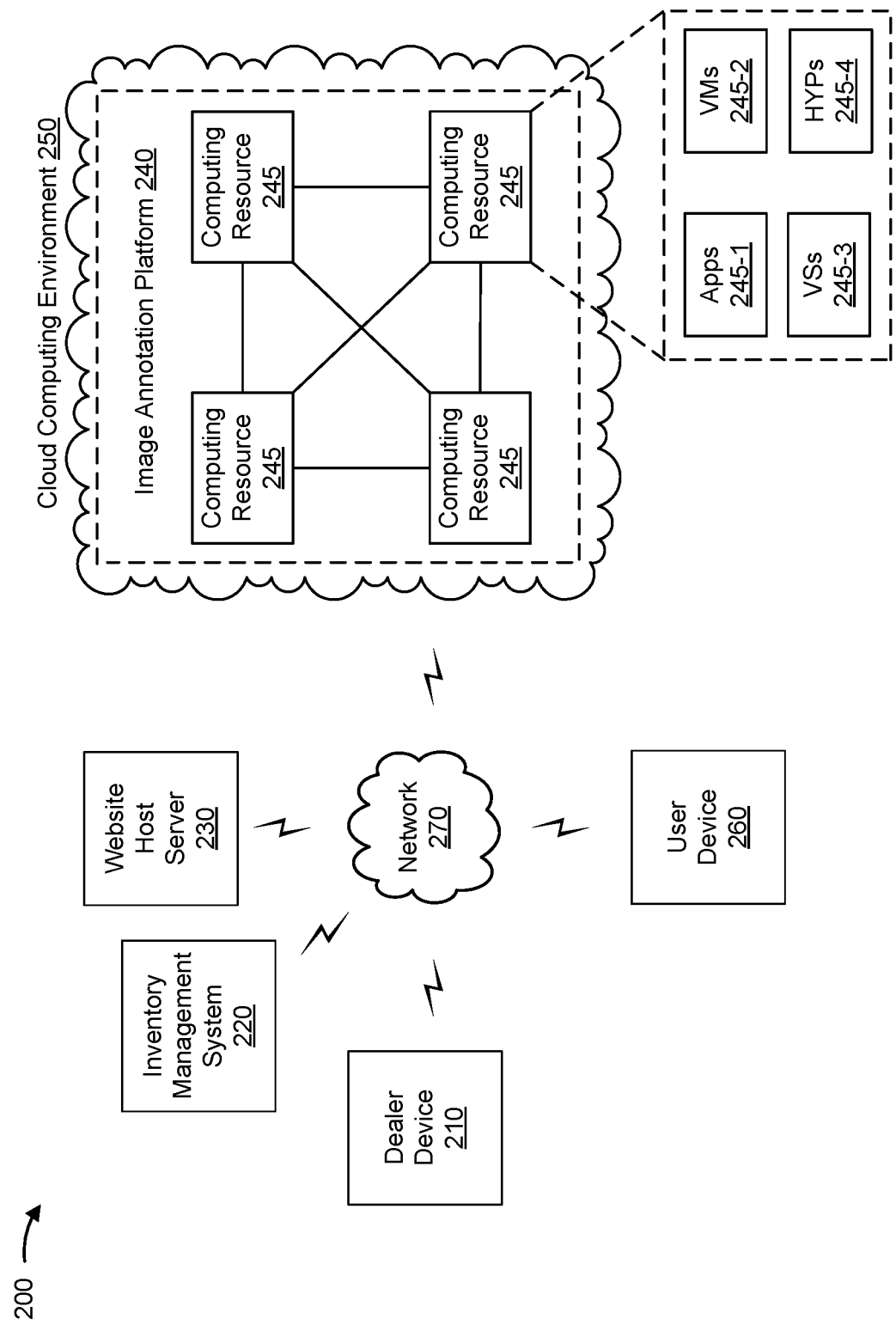
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include a dealer device 210, an inventory management system 220, a website host server 230, an image annotation platform 240, a computing resource 245, a cloud computing environment 250, a user device 260, and a network 270. Devices of environment 200 may interconnect via wired connections, wireless connections, or a combination of wired and wireless connections.

Dealer device 210 includes one or more devices capable of receiving, generating, storing, processing, displaying, and/or providing information associated with images of vehicles, damage on vehicles, identification of vehicles, identification of vehicle dealers, and/or the like. For example, dealer device 210 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device.

Inventory management system 220 includes one or more devices capable of receiving, generating, storing, processing, displaying, and/or providing information associated with images of vehicles, damage on vehicles, identification of vehicles, identification of vehicle dealers, vehicle dealer inventory, and/or the like. For example, inventory management system 220 may include one or more servers and/or computers to store and/or provide information (e.g., numbers of vehicles, types of vehicles, prices of vehicles, information about vehicles, images of vehicles, and/or the like) associated with a vehicle dealer.

Website host server 230 includes a device capable of serving web content (e. g., web documents, HyperText Markup Language (HTML) documents, web resources, images, style sheets, scripts, text, and/or the like). For example, website host server 230 may include a server and/or computing resources of a server, which may be included in a data center, a cloud computing environment, and/or the like. Website host server 230 may process incoming network requests (e. g., from user device 260) using HyperText Transfer Protocol (HTTP) and/or another protocol. Website host server 230 may store, process, and/or deliver web pages to user device 260. In some implementations, communication between website host server 230 and user device 260 may take place using HTTP.

Image annotation platform 240 includes one or more computing resources assigned to receiving, generating, storing, processing, and/or providing information associated with images of vehicles, damage on vehicles, identification of vehicles, identification of vehicle dealers, and/or the like. For example, image annotation platform 240 may be a platform implemented by cloud computing environment 250 that may receive, generate, store, process, and/or provide information related to images of vehicles, data models for representing an expected visual appearance of one or more vehicle parts, content items for identifying damaged parts in images of a vehicles, and/or the like. In some implementations, image annotation platform 240 is implemented by computing resources 245 of cloud computing environment 250.

Image annotation platform 240 may include a server device or a group of server devices. In some implementations, image annotation platform 240 may be hosted in cloud computing environment 250. Notably, while implementations described herein describe image annotation platform 240 as being hosted in cloud computing environment 250, in some implementations, image annotation platform 240 may be non-cloud-based or may be partially cloud-based. For example, image annotation platform 240 may be a platform implemented by website host server 230.

Cloud computing environment 250 includes an environment that delivers computing as a service, whereby shared resources, services, and/or the like may be provided to dealer device 210, inventory management system 220, website host server 230, image annotation platform 240, and/or user device 260. Cloud computing environment 250 may provide computation, software, data access, storage, and/or other services that do not require end-user knowledge of a physical location and configuration of a system and/or a device that delivers the services. As shown, cloud computing environment 250 may include image annotation platform 240 and/or computing resource 245.

Computing resource 245 includes one or more personal computers, workstation computers, server devices, or another type of computation and/or communication device. In some implementations, computing resource 245 may host image annotation platform 240. The cloud resources may include compute instances executing in computing resource 245, storage devices provided in computing resource 245, data transfer devices provided by computing resource 245, and/or the like. In some implementations, computing resource 245 may communicate with other computing resources 245 via wired connections, wireless connections, or a combination of wired and wireless connections.

As further shown in FIG. 2, computing resource 245 may include a group of cloud resources, such as one or more applications ("APPs") 245-1, one or more virtual machines ("VMs") 245-2, virtualized storage ("VSs") 245-3, one or more hypervisors ("HYPs") 245-4, or the like.

Application 245-1 includes one or more software applications that may be provided to or accessed by dealer device 210, inventory management system 220, website host server 230, image annotation platform 240, and/or user device 260. Application 245-1 may eliminate a need to install and execute the software applications on dealer device 210, inventory management system 220, website host server 230, image annotation platform 240, and/or user device 260. For example, application 245-1 may include software associated with image annotation platform 240 and/or any other software capable of being provided via cloud computing environment 250. In some implementations, one application 245-1 may send/receive information to/from one or more other applications 245-1, via virtual machine 245-2.

Virtual machine 245-2 includes a software implementation of a machine (e.g., a computer) that executes programs like a physical machine. Virtual machine 245-2 may be either a system virtual machine or a process virtual machine, depending upon use and degree of correspondence to any real machine by virtual machine 245-2. A system virtual machine may provide a complete system platform that supports execution of a complete operating system ("OS"). A process virtual machine may execute a single program and may support a single process. In some implementations, virtual machine 245-2 may execute on behalf of a user (e.g., dealer device 210, inventory management system 220, website host server 230, image annotation platform 240, and/or user device 260), and may manage infrastructure of cloud computing environment 250, such as data management, synchronization, or long-duration data transfers.

Virtualized storage 245-3 includes one or more storage systems and/or one or more devices that use virtualization techniques within the storage systems or devices of computing resource 245. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 245-4 provides hardware virtualization techniques that allow multiple operating systems (e.g., "guest operating systems") to execute concurrently on a host computer, such as computing resource 245. Hypervisor 245-4 may present a virtual operating platform to the "guest operating systems" and may manage the execution of the guest operating systems. Multiple instances of a variety of operating systems may share virtualized hardware resources.

User device 260 includes one or more devices capable of receiving, generating, storing, processing, and/or providing information associated with websites, images of vehicles, damage on vehicles, identification of vehicles, identification of vehicle dealers, and/or the like. For example, user device 260 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

Network 270 includes one or more wired and/or wireless networks. For example, network 270 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
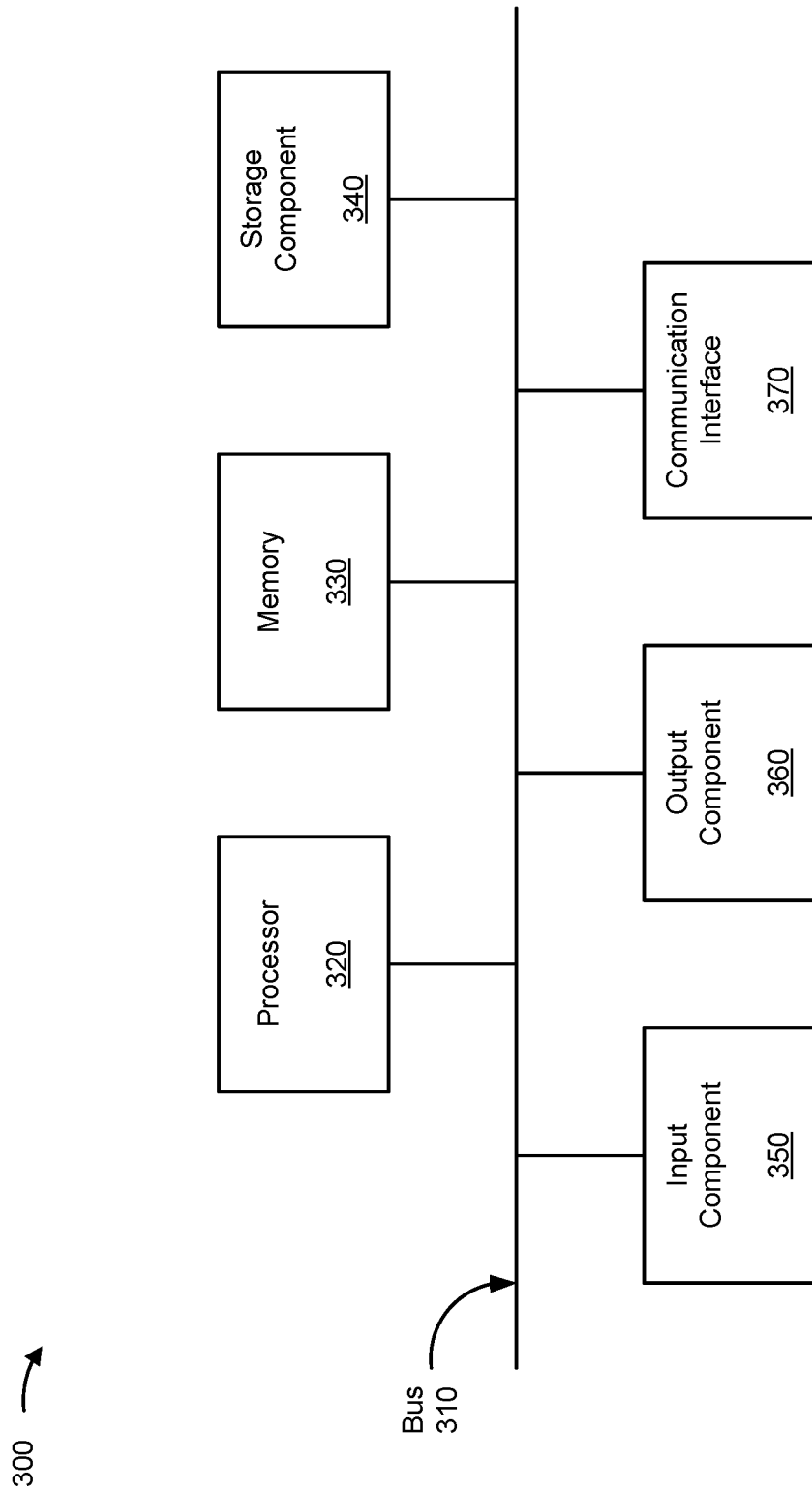
FIG. 3 is a diagram of example components of one or more devices of FIG. 2.

FIG. 3 is a diagram of example components of a device 300. Device 300 may correspond to dealer device 210, inventory management system 220, website host server 230, image annotation platform 240, computing resource 245, and/or user device 260. In some implementations, dealer device 210, inventory management system 220, website host server 230, image annotation platform 240, computing resource 245, and/or user device 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
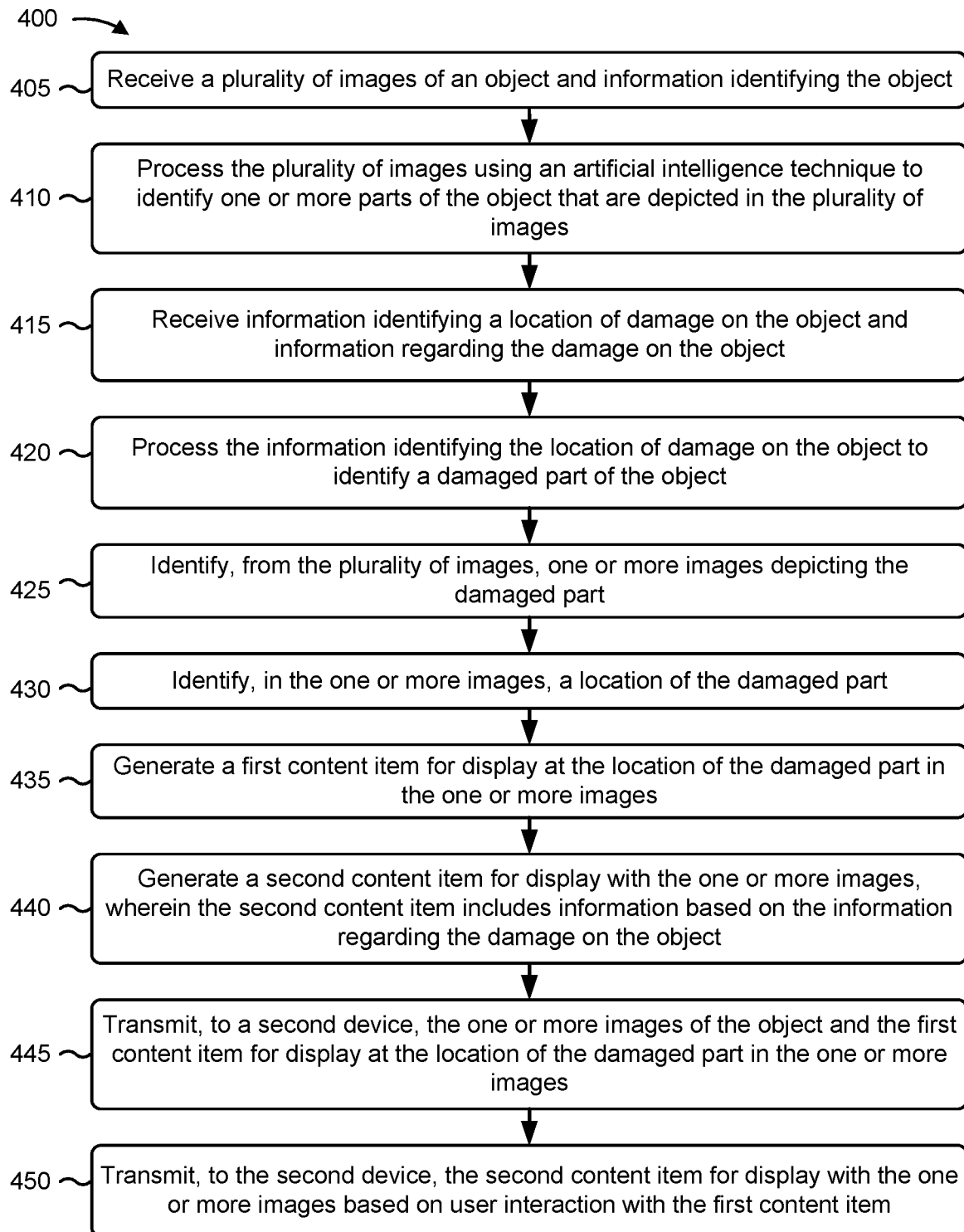
FIGS. 4-6 are flowcharts of an example process for visualization of damage on images.

FIG. 4 is a flow chart of an example process 400 for visualizing damage in images. In some implementations, one or more process blocks of FIG. 4 may be performed by a first device (e.g., image annotation platform 240). In some implementations, one or more process blocks of FIG. 4 may be performed by another device or a group of devices separate from or including the first device, such as a dealer device (e.g., dealer device 210), an inventory management system (e.g., inventory management system 220), a website host server (e.g., website host server 230), a computing resource (e.g., computing resource 245), a user device (e.g., user device 260), and/or the like.

As shown in FIG. 4, process 400 may include receiving a plurality of images of an object and information identifying the object (block 405). For example, the first device (e.g., using computing resource 245, processor 320, memory 330, storage component 340, input component 350, output component 360, communication interface 370, and/or the like) may receive a plurality of images of an object and information identifying the object, as described above.

As further shown in FIG. 4, process 400 may include processing the plurality of images using an artificial intelligence technique to identify one or more parts of the object that are depicted in the plurality of images (block 410). For example, the first device (e.g., using computing resource 245, processor 320, memory 330, storage component 340, input component 350, output component 360, communication interface 370, and/or the like) may process the plurality of images using an artificial intelligence technique to identify one or more parts of the object that are depicted in the plurality of images, as described above.

As further shown in FIG. 4, process 400 may include receiving information identifying a location of damage on the object and information regarding the damage on the object (block 415). For example, the first device (e.g., using computing resource 245, processor 320, memory 330, storage component 340, input component 350, output component 360, communication interface 370, and/or the like) may receive information identifying a location of damage on the object and information regarding the damage on the object, as described above.

As further shown in FIG. 4, process 400 may include processing the information identifying the location of damage on the object to identify a damaged part of the object (block 420). For example, the first device (e.g., using computing resource 245, processor 320, memory 330, storage component 340, input component 350, output component 360, communication interface 370, and/or the like) may process the information identifying the location of damage on the object to identify a damaged part of the object, as described above.

As further shown in FIG. 4, process 400 may include identifying, from the plurality of images, one or more images depicting the damaged part (block 425). For example, the first device (e.g., using computing resource 245, processor 320, memory 330, storage component 340, input component 350, output component 360, communication interface 370, and/or the like) may identify, from the plurality of images, one or more images depicting the damaged part, as described above.

As further shown in FIG. 4, process 400 may include identifying, in the one or more images, a location of the damaged part (block 430). For example, the first device (e.g., using computing resource 245, processor 320, memory 330, storage component 340, input component 350, output component 360, communication interface 370, and/or the like) may identify, in the one or more images, a location of the damaged part, as described above.

As further shown in FIG. 4, process 400 may include generating a first content item for display at the location of the damaged part in the one or more images (block 435). For example, the first device (e.g., using computing resource 245, processor 320, memory 330, storage component 340, input component 350, output component 360, communication interface 370, and/or the like) may generate a first content item for display at the location of the damaged part in the one or more images, as described above.

As further shown in FIG. 4, process 400 may include generating a second content item for display with the one or more images wherein the second content item includes information based on the information regarding the damage on the object (block 440). For example, the first device (e.g., using computing resource 245, processor 320, memory 330, storage component 340, input component 350, output component 360, communication interface 370, and/or the like) may generate a second content item for display with the one or more images, as described above. In some implementations, the second content item includes information based on the information regarding the damage on the object.

As further shown in FIG. 4, process 400 may include transmitting, to a second device, the one or more images of the object and the first content item for display at the location of the damaged part in the one or more images (block 445). For example, the first device (e.g., using computing resource 245, processor 320, memory 330, storage component 340, input component 350, output component 360, communication interface 370, and/or the like) may transmit, to a second device, the one or more images of the object and the first content item for display at the location of the damaged part in the one or more images, as described above.

As further shown in FIG. 4, process 400 may include transmitting, to the second device, the second content item for display with the one or more images based on user interaction with the first content item (block 450). For example, the first device (e.g., using computing resource 245, processor 320, memory 330, storage component 340, input component 350, output component 360, communication interface 370, and/or the like) may transmit, to the second device, the second content item for display with the one or more images based on user interaction with the first content item, as described above.

Process 400 may include additional implementations, such as any single implementation or any combination of implementations described below and/or in connection with one or more other processes described elsewhere herein.

In a first implementation, process 400 may include receiving, from the second device, user selection of a filtering option, and transmitting, to the second device, the one or more images depicting the damaged part without transmitting one or more other images, of the plurality of images, that do not depict the damaged part.

In a second implementation, alone or in combination with the first implementation, the second content item is transmitted for display in a location within the one or more images adjacent to the location of the damaged part in the one or more images.

In a third implementation, alone or in combination with one or more of the first and second implementations, process 400 may include receiving information identifying a plurality of objects and information identifying locations of damage on the plurality of objects, processing the information identifying locations of damage on the plurality of objects to determine a number of defects on each object of the plurality of objects, receiving, from the second device, a user selection of a sorting option, and transmitting, to the second device, search results listing the plurality of objects in order based on the number of defects on each object.

In a fourth implementation, alone or in combination with one or more of the first through third implementations, the plurality of images: have a plurality of resolutions, have a plurality of aspect ratios, have a plurality of color conditions, have a plurality of lighting conditions, have a plurality of brightness conditions, have a plurality of orientations with respect to the object, or originate from a plurality of sources.

In a fifth implementation, alone or in combination with one or more of the first through fourth implementations, processing the plurality of images using the artificial intelligence technique includes processing the plurality of images to standardize the plurality of images to form a standardized plurality of images, wherein the standardized plurality of images has a common resolution, a common aspect ratio, a common color condition, and/or a common brightness condition, and processing the standardized plurality of images to identify the one or more parts of the object that are depicted in the standardized plurality of images.

In a sixth implementation, alone or in combination with one or more of the first through fifth implementations, processing the plurality of images using the artificial intelligence technique includes assigning the plurality of images to one or more classes of images based on characteristics of the plurality of images and processing one or more of the plurality of images, assigned to one of the one or more classes of images, using an artificial intelligence technique specific to the one of the one or more classes of images to identify one or more parts of the object that are depicted in the one or more of the plurality of images.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
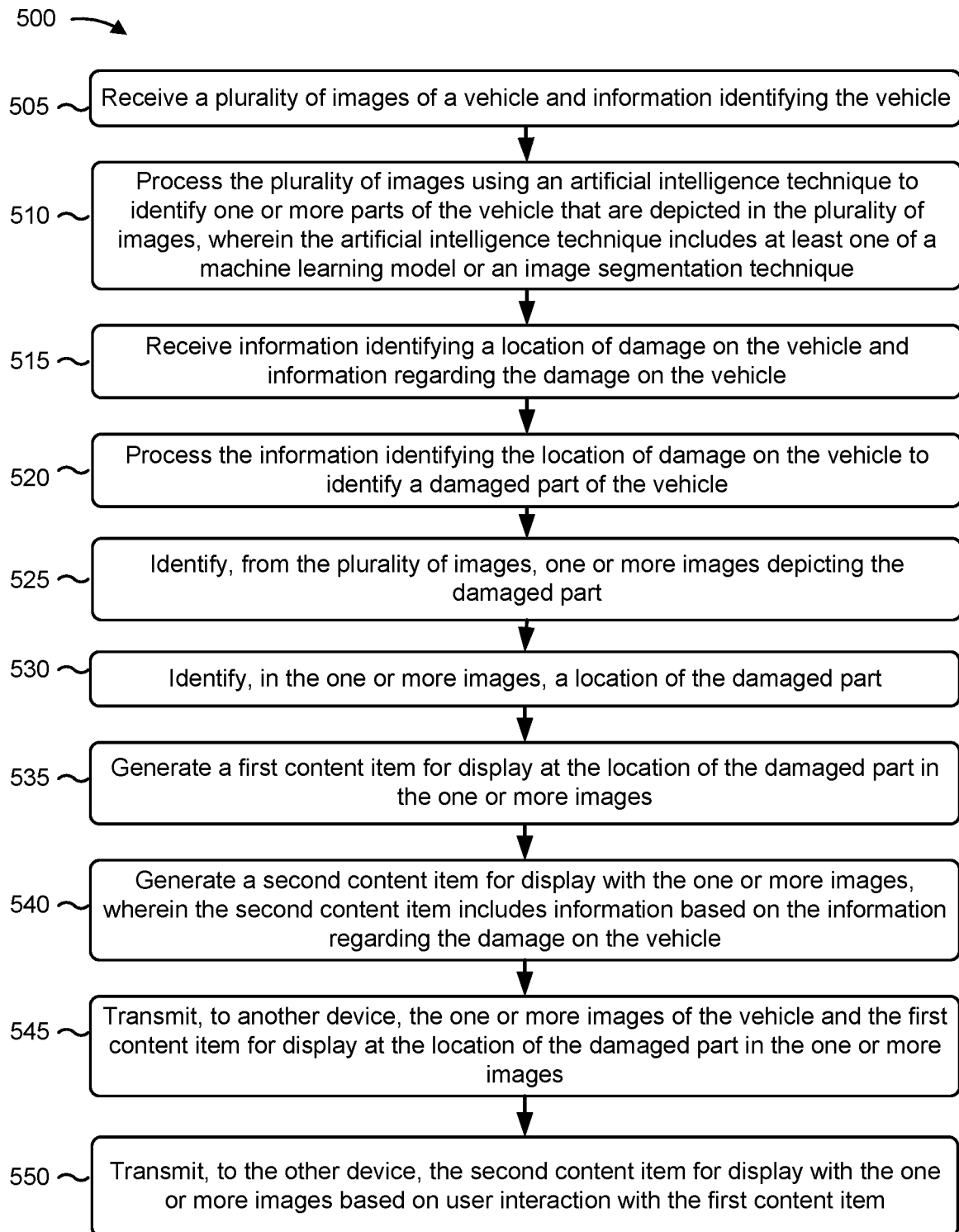

FIG. 5 is a flow chart of an example process 500 for visualizing damage in images. In some implementations, one or more process blocks of FIG. 5 may be performed by a device (e.g., image annotation platform 240). In some implementations, one or more process blocks of FIG. 5 may be performed by another device or a group of devices separate from or including the device, such as a dealer device (e.g., dealer device 210), an inventory management system (e.g., inventory management system 220), a website host server (e.g., website host server 230), a computing resource (e.g., computing resource 245), a user device (e.g., user device 260), and/or the like.

As shown in FIG. 5, process 500 may include receiving a plurality of images of a vehicle and information identifying the vehicle (block 505). For example, the device (e.g., using computing resource 245, processor 320, memory 330, storage component 340, input component 350, output component 360, communication interface 370, and/or the like) may receive a plurality of images of a vehicle and information identifying the vehicle, as described above.

As further shown in FIG. 5, process 500 may include processing the plurality of images using an artificial intelligence technique to identify one or more parts of the vehicle that are depicted in the plurality of images wherein the artificial intelligence technique includes at least one of a machine learning model or an image segmentation technique (block 510). For example, the device (e.g., using computing resource 245, processor 320, memory 330, storage component 340, input component 350, output component 360, communication interface 370, and/or the like) may process the plurality of images using an artificial intelligence technique to identify one or more parts of the vehicle that are depicted in the plurality of images, as described above. In some implementations, the artificial intelligence technique includes at least one of a machine learning model or an image segmentation technique.

As further shown in FIG. 5, process 500 may include receiving information identifying a location of damage on the vehicle and information regarding the damage on the vehicle (block 515). For example, the device (e.g., using computing resource 245, processor 320, memory 330, storage component 340, input component 350, output component 360, communication interface 370, and/or the like) may receive information identifying a location of damage on the vehicle and information regarding the damage on the vehicle, as described above.

As further shown in FIG. 5, process 500 may include processing the information identifying the location of damage on the vehicle to identify a damaged part of the vehicle (block 520). For example, the device (e.g., using computing resource 245, processor 320, memory 330, storage component 340, input component 350, output component 360, communication interface 370, and/or the like) may process the information identifying the location of damage on the vehicle to identify a damaged part of the vehicle, as described above.

As further shown in FIG. 5, process 500 may include identifying, from the plurality of images, one or more images depicting the damaged part (block 525). For example, the device (e.g., using computing resource 245, processor 320, memory 330, storage component 340, input component 350, output component 360, communication interface 370, and/or the like) may identify, from the plurality of images, one or more images depicting the damaged part, as described above.

As further shown in FIG. 5, process 500 may include identifying, in the one or more images, a location of the damaged part (block 530). For example, the device (e.g., using computing resource 245, processor 320, memory 330, storage component 340, input component 350, output component 360, communication interface 370, and/or the like) may identify, in the one or more images, a location of the damaged part, as described above.

As further shown in FIG. 5, process 500 may include generating a first content item for display at the location of the damaged part in the one or more images (block 535). For example, the device (e.g., using computing resource 245, processor 320, memory 330, storage component 340, input component 350, output component 360, communication interface 370, and/or the like) may generate a first content item for display at the location of the damaged part in the one or more images, as described above.

As further shown in FIG. 5, process 500 may include generating a second content item for display with the one or more images wherein the second content item includes information based on the information regarding the damage on the vehicle (block 540). For example, the device (e.g., using computing resource 245, processor 320, memory 330, storage component 340, input component 350, output component 360, communication interface 370, and/or the like) may generate a second content item for display with the one or more images, as described above. In some implementations, the second content item includes information based on the information regarding the damage on the vehicle.

As further shown in FIG. 5, process 500 may include transmitting, to another device, the one or more images of the vehicle and the first content item for display at the location of the damaged part in the one or more images (block 545). For example, the device (e.g., using computing resource 245, processor 320, memory 330, storage component 340, input component 350, output component 360, communication interface 370, and/or the like) may transmit, to another device, the one or more images of the vehicle and the first content item for display at the location of the damaged part in the one or more images, as described above.

As further shown in FIG. 5, process 500 may include transmitting, to the other device, the second content item for display with the one or more images based on user interaction with the first content item (block 550). For example, the device (e.g., using computing resource 245, processor 320, memory 330, storage component 340, input component 350, output component 360, communication interface 370, and/or the like) may transmit, to the other device, the second content item for display with the one or more images based on user interaction with the first content item, as described above.

Process 500 may include additional implementations, such as any single implementation or any combination of implementations described below and/or in connection with one or more other processes described elsewhere herein.

In a first implementation, the second content item includes a close-up image of damage on the damaged part.

In a second implementation, alone or in combination with the first implementation, process 500 may include receiving, from the other device, user selection of a filtering option and transmitting, to the other device, the one or more images depicting the damaged part without transmitting one or more other images, of the plurality of images, that do not depict the damaged part.

In a third implementation, alone or in combination with one or more of the first and second implementations, process 500 may include storing, in a data structure, information identifying the damaged part of the vehicle and the information regarding the damage on the vehicle in association with the information identifying the vehicle, receiving another plurality of images of the vehicle, and identifying, in the other plurality of images, a location of the damaged part in one or more of the other plurality of images based on the information identifying the damaged part of the vehicle.

In a fourth implementation, alone or in combination with one or more of the first through third implementations, the plurality of images: have a plurality of resolutions, have a plurality of aspect ratios, have a plurality of color conditions, have a plurality of lighting conditions, have a plurality of brightness conditions, have a plurality of orientations with respect to the object, or originate from a plurality of sources.

In a fifth implementation, alone or in combination with one or more of the first through fourth implementations, process 500 may include, when processing the plurality of images using the artificial intelligence technique, process the plurality of images to standardize the plurality of images to form a standardized plurality of images, wherein the standardized plurality of images has a common resolution, a common aspect ratio, a common color condition, and/or a common brightness condition, and processing the standardized plurality of images to identify the one or more parts of the vehicle that are depicted in the standardized plurality of images.

In a sixth implementation, alone or in combination with one or more of the first through fifth implementations, process 500 may include, when processing the plurality of images using the artificial intelligence technique, assigning the plurality of images to one or more classes of images based on characteristics of the plurality of images and processing one or more of the plurality of images, assigned to one of the one or more classes of images, using an artificial intelligence technique specific to the one of the one or more classes of images to identify one or more parts of the vehicle that are depicted in the one or more of the plurality of images.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
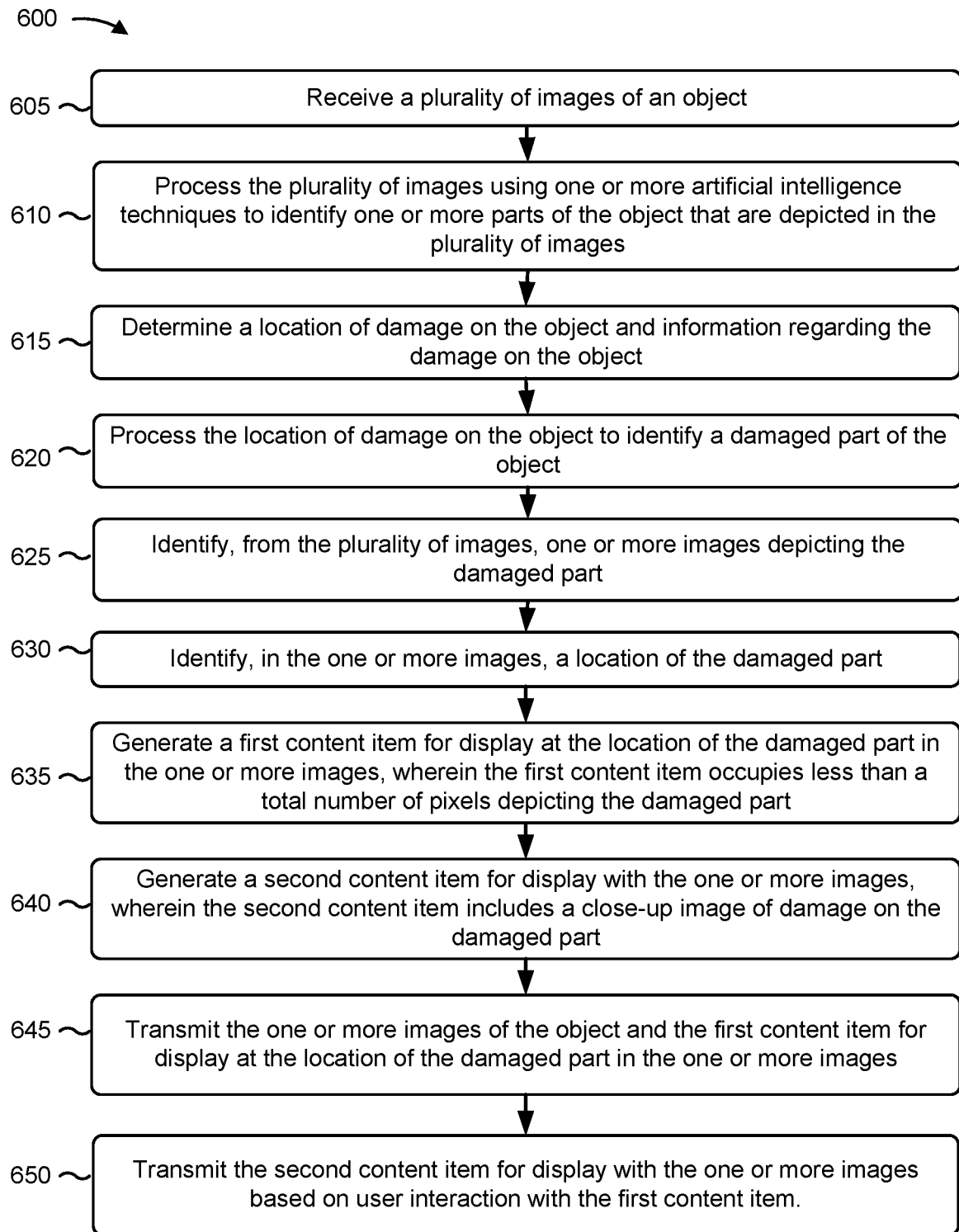

FIG. 6 is a flow chart of an example process 600 for visualizing damage in images. In some implementations, one or more process blocks of FIG. 6 may be performed by an image annotation platform (e.g., image annotation platform 240). In some implementations, one or more process blocks of FIG. 6 may be performed by another device or a group of devices separate from or including the image annotation platform, such as a dealer device (e.g., dealer device 210), an inventory management system (e.g., inventory management system 220), a website host server (e.g., website host server 230), a computing resource (e.g., computing resource 245), a user device (e.g., user device 260), and/or the like.

As shown in FIG. 6, process 600 may include receiving a plurality of images of an object (block 605). For example, the image annotation platform (e.g., using computing resource 245, processor 320, memory 330, storage component 340, input component 350, output component 360, communication interface 370, and/or the like) may receive a plurality of images of an object, as described above.

As further shown in FIG. 6, process 600 may include processing the plurality of images using one or more artificial intelligence techniques to identify one or more parts of the object that are depicted in the plurality of images (block 610). For example, the image annotation platform (e.g., using computing resource 245, processor 320, memory 330, storage component 340, input component 350, output component 360, communication interface 370, and/or the like) may process the plurality of images using one or more artificial intelligence techniques to identify one or more parts of the object that are depicted in the plurality of images, as described above.

As further shown in FIG. 6, process 600 may include determining a location of damage on the object and information regarding the damage on the object (block 615). For example, the image annotation platform (e.g., using computing resource 245, processor 320, memory 330, storage component 340, input component 350, output component 360, communication interface 370, and/or the like) may determine a location of damage on the object and information regarding the damage on the object, as described above.

As further shown in FIG. 6, process 600 may include processing the location of damage on the object to identify a damaged part of the object (block 620). For example, the image annotation platform (e.g., using computing resource 245, processor 320, memory 330, storage component 340, input component 350, output component 360, communication interface 370, and/or the like) may process the location of damage on the object to identify a damaged part of the object, as described above.

As further shown in FIG. 6, process 600 may include identifying, from the plurality of images, one or more images depicting the damaged part (block 625). For example, the image annotation platform (e.g., using computing resource 245, processor 320, memory 330, storage component 340, input component 350, output component 360, communication interface 370, and/or the like) may identify, from the plurality of images, one or more images depicting the damaged part, as described above.

As further shown in FIG. 6, process 600 may include identifying, in the one or more images, a location of the damaged part (block 630). For example, the image annotation platform (e.g., using computing resource 245, processor 320, memory 330, storage component 340, input component 350, output component 360, communication interface 370, and/or the like) may identify, in the one or more images, a location of the damaged part, as described above.

As further shown in FIG. 6, process 600 may include generating a first content item for display at the location of the damaged part in the one or more images wherein the first content item occupies less than a total number of pixels depicting the damaged part (block 635). For example, the image annotation platform (e.g., using computing resource 245, processor 320, memory 330, storage component 340, input component 350, output component 360, communication interface 370, and/or the like) may generate a first content item for display at the location of the damaged part in the one or more images, as described above. In some implementations, the first content item occupies less than a total number of pixels depicting the damaged part.

As further shown in FIG. 6, process 600 may include generating a second content item for display with the one or more images wherein the second content item includes a close-up image of damage on the damaged part (block 640). For example, the image annotation platform (e.g., using computing resource 245, processor 320, memory 330, storage component 340, input component 350, output component 360, communication interface 370, and/or the like) may generate a second content item for display with the one or more images, as described above. In some implementations, the second content item includes a close-up image of damage on the damaged part.

As further shown in FIG. 6, process 600 may include transmitting the one or more images of the object and the first content item for display at the location of the damaged part in the one or more images (block 645). For example, the image annotation platform (e.g., using computing resource 245, processor 320, memory 330, storage component 340, input component 350, output component 360, communication interface 370, and/or the like) may transmit the one or more images of the object and the first content item for display at the location of the damaged part in the one or more images, as described above.

As further shown in FIG. 6, process 600 may include transmitting the second content item for display with the one or more images based on user interaction with the first content item (block 650). For example, the image annotation platform (e.g., using computing resource 245, processor 320, memory 330, storage component 340, input component 350, output component 360, communication interface 370, and/or the like) may transmit the second content item for display with the one or more images based on user interaction with the first content item, as described above.

Process 600 may include additional implementations, such as any single implementation or any combination of implementations described below and/or in connection with one or more other processes described elsewhere herein.

In a first implementation, process 600 may include storing, in a data structure, information identifying the damaged part of the object and the information regarding the damage on the object in association with information identifying the object, receiving another plurality of images of the object and the information identifying the object, associating the other plurality of images with the object based on the information identifying the object, and identifying, in the other plurality of images, a location of the damaged part in the other plurality of images based on the information identifying the damaged part of the object.

In a second implementation, alone or in combination with the first implementation, process 600 may include receiving information identifying a plurality of objects and information identifying locations of damage on the plurality of objects, processing the information identifying locations of damage on the plurality of objects to determine a number of defects on each object of the plurality of objects, and transmitting a listing of the plurality of objects in order based on the number of defects on each object.

In a third implementation, alone or in combination with one or more of the first and second implementations, the plurality of images: have a plurality of resolutions, have a plurality of aspect ratios, have a plurality of color conditions, have a plurality of lighting conditions, have a plurality of brightness conditions, have a plurality of orientations with respect to the object, or originate from a plurality of sources.

In a fourth implementation, alone or in combination with one or more of the first through third implementations, process 600 may include, when processing the plurality of images using the one or more artificial intelligence techniques, processing the plurality of images to standardize the plurality of images to form a standardized plurality of images, wherein the standardized plurality of images has a common resolution, a common aspect ratio, a common color condition, and/or a common brightness condition, and processing the standardized plurality of images to identify the one or more parts of the object that are depicted in the standardized plurality of images.

In a fifth implementation, alone or in combination with one or more of the first through fourth implementations, process 600 may include, when processing the plurality of images using the one or more artificial intelligence techniques, assigning the plurality of images to one or more classes of images based on characteristics of the plurality of images and processing one or more of the plurality of images, assigned to one of the one or more classes of images, using an artificial intelligence technique specific to the one of the one or more classes of images to identify one or more parts of the object that are depicted in the one or more of the plurality of images.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    obtaining, by a device, a plurality of images of a vehicle and information identifying one or more parts of the vehicle,
        wherein the plurality of images:
            were obtained from a variety of types of cameras, and
            had a variety of lighting conditions;
    processing, by the device using an artificial intelligence technique, the plurality of images to form a standardized plurality of images,
        wherein the standardized plurality of images have a common lighting condition;
    processing, by the device, the standardized plurality of images to identify the one or more parts of the vehicle;
    receiving, by the device, information identifying a location of damage on the vehicle and information regarding the damage on the vehicle;
    processing, by the device, the information identifying the location of the damage on the vehicle to identify a damaged part of the vehicle;
    identifying, by the device and from the plurality of images, one or more images depicting the damaged part of the vehicle;
    storing, by the device, information identifying the damaged part of the vehicle and the information identifying one or more parts of the vehicle; and
    transmitting, by the device and to a server device, a content item with the one or more images depicting the damaged part of the vehicle,
        wherein the content item includes an image of the damaged part displayed at a location, in the one or more images, that is adjacent to the location of the damage on the vehicle; and
        wherein the content item includes a geometric shape based on a type of the damage on the vehicle.

2. The method of claim 1, wherein transmitting the content item comprises:
    transmitting a first type of content item for a first type of damage in the image of the damaged part and transmitting a second type of content item for a second type of damage in the image of the damaged part.

3. The method of claim 1, further comprising:
    obtaining another plurality of images of the vehicle;
    identifying, in the other plurality of images, parts of the vehicle using the artificial intelligence technique; and
    identifying, in one or more of the other plurality of images, the damaged part of the vehicle.

4. The method of claim 1, further comprising:
    storing the information identifying the damaged part of the vehicle and information identifying the vehicle in a data structure.

5. The method of claim 1, further comprising:
    receiving information identifying the vehicle,
        wherein the information identifying the vehicle includes one or more of:
            a make of the vehicle,
            a model of the vehicle,
            a year of the vehicle, or
            a vehicle identification number (VIN).

6. The method of claim 1, further comprising:
    receiving, from another device, a user selection of a filtering option; and
    transmitting, to the other device, the one or more images depicting the damaged part of the vehicle without transmitting one or more other images, of the plurality of images, that do not depict the damaged part of the vehicle.

7. The method of claim 1, further comprising:
    generating the content item for display with the one or more images depicting the damaged part of the vehicle,
        wherein the content item includes information regarding the damage on the vehicle.

8. A device, comprising:
    one or more memories; and
    one or more processors, communicatively coupled to the one or more memories, configured to:
        obtain a plurality of images of a vehicle and information identifying one or more parts of the vehicle,
            wherein the plurality of images:
                were obtained from a variety of types of cameras, and
                had a variety of lighting conditions;
        process, using an artificial intelligence technique, the plurality of images to form a standardized plurality of images,
            wherein the standardized plurality of images have a common brightness condition;
        process the standardized plurality of images to identify the one or more parts of the vehicle;
        receive information identifying a location of damage on the vehicle and information regarding the damage on the vehicle;
        process the information identifying the location of the damage on the vehicle to identify a damaged part of the vehicle;
        identify, from the plurality of images, one or more images depicting the damaged part of the vehicle;
        store information identifying the damaged part of the vehicle and the information identifying one or more parts of the vehicle; and
        transmit, to a server device, a content item with the one or more images depicting the damaged part of the vehicle,
            wherein the content item includes a geometric shape for display at a location, in the one or more images depicting the damaged part of the vehicle, that is adjacent to the location of the damage on the vehicle,
            wherein the geometric shape is based on a type of the damage on the vehicle.

27

9. The device of claim 8, wherein the one or more processors are further configured to:
provide, to another device, characteristics of the vehicle including one or more of:
vehicle mileage,
vehicle price, or
vehicle color.

10. The device of claim 8, wherein the one or more processors are further configured to:
receive another plurality of images of the vehicle;
identify, in the other plurality of images, parts of the vehicle using the artificial intelligence technique; and
identify, in one or more of the other plurality of images, the damaged part of the vehicle.

11. The device of claim 8, wherein the one or more processors are further configured to:
transmit a first type of content item for a first type of damage in the one or more images of the damaged part and transmit a second type of content item for a second type of damage in the one or more images of the damaged part.

12. The device of claim 8, wherein the one or more processors are further configured to:
receive information identifying the vehicle,
wherein the information identifying the vehicle includes one or more of:
a make of the vehicle,
a model of the vehicle,
a year of the vehicle, or
a vehicle identification number (VIN).

13. The device of claim 8, wherein the one or more processors are further configured to:
receive, from another device, a user selection of a filtering option; and
transmit, to the other device, the one or more images depicting the damaged part of the vehicle without transmitting one or more other images, of the plurality of images, that do not depict the damaged part of the vehicle.

14. The device of claim 8, wherein the geometric shape includes one or more of:
a circle,
a triangle, or
a square.

15. A non-transitory computer-readable medium storing instructions, the instructions comprising:
one or more instructions that, when executed by one or more processors, cause the one or more processors to:
obtain a plurality of images of a vehicle and information identifying one or more parts of the vehicle,
wherein the plurality of images:
were obtained from a variety of types of cameras, and
had a variety of lighting conditions;
process, using an artificial intelligence technique, the plurality of images to form a standardized plurality of images,
wherein the standardized plurality of images have a common aspect ratio;
process the standardized plurality of images to identify the one or more parts of the vehicle;

28 receive information identifying a location of damage on the vehicle and information regarding the damage on the vehicle;
process the information identifying the location of the damage on the vehicle to identify a damaged part of the vehicle;
identify, from the plurality of images, one or more images depicting the damaged part of the vehicle; and
transmit, to a server device, a content item with the one or more images depicting the damaged part of the vehicle,
wherein the content item includes an overlay for display at a location, in the one or more images depicting the damaged part of the vehicle, that is adjacent to the location of the damage on the vehicle,
wherein the overlay is a geometric shape based on a type of the damage of the vehicle.

16. The non-transitory computer-readable medium of claim 15, wherein the one or more instructions, when executed by the one or more processors, further cause the one or more processors to:
receive another plurality of images of the vehicle;
identify, in the other plurality of images, parts of the vehicle using the artificial intelligence technique; and
identify, in one or more of the other plurality of images, the damaged part of the vehicle.

17. The non-transitory computer-readable medium of claim 15, wherein the one or more instructions, when executed by the one or more processors, further cause the one or more processors to:
store the information identifying one or more parts of the vehicle and information identifying the vehicle in a data structure.

18. The non-transitory computer-readable medium of claim 15, wherein the one or more instructions, when executed by the one or more processors, further cause the one or more processors to:
receive information identifying the vehicle,
wherein the information identifying the vehicle includes one or more of:
a make of the vehicle,
a model of the vehicle,
a year of the vehicle, or
a vehicle identification number (VIN).

19. The non-transitory computer-readable medium of claim 15, wherein the one or more instructions, when executed by the one or more processors, further cause the one or more processors to:
receive, from another device, a user selection of a filtering option; and
transmit, to the other device, the one or more images depicting the damaged part of the vehicle without transmitting one or more other images, of the plurality of images, that do not depict the damaged part of the vehicle.

20. The non-transitory computer-readable medium of claim 15, wherein the overlay includes one or more of:
a colored overlay, or
a patterned overlay.

* * * * *